US011419260B1

(12) United States Patent
Mohns (10) Patent No.: US 11,419,260 B1
(45) Date of Patent: Aug. 23, 2022

(54) SEED CONTAINING AND DISPENSING SYSTEM (71) Applicant: Brad Mohns, Round Lake, MN (US)

(72) Inventor: Brad Mohns, Round Lake, MN (US)

( * ) Notice: Subject to any disclaimer, the term of this patent is extended or adjusted under 35 U.S.C. 154(b) by 0 days.

(21) Appl. No.: 17/209,913

(22) Filed: Mar. 23, 2021

Related U.S. Application Data (60) Provisional application No. 62/993,872, filed on Mar. 24, 2020.

(51) Int. Cl.
*A01C 7/16* (2006.01)
*A01C 15/00* (2006.01)
*B65G 33/14* (2006.01)
*B65G 65/34* (2006.01)
*B65G 69/20* (2006.01)

(52) U.S. Cl.
CPC .............. *A01C 7/16* (2013.01); *A01C 15/006* (2013.01); *B65G 33/14* (2013.01); *B65G 65/34* (2013.01); *B65G 69/20* (2013.01)

(58) Field of Classification Search
CPC .. A01C 7/16; A01C 7/06; B65G 33/14; B65G 65/34; B65G 65/38; B65G 65/46; B65G 65/466; B65G 65/22; B65G 65/28; B65G 69/20; B65G 41/002; B65G 41/005; B65G 41/02; B65G 47/02; B65G 47/52; B65G 47/644; B65G 47/648; B60P 1/42
See application file for complete search history.

(56) References Cited

U.S. PATENT DOCUMENTS

| 2,605,885 | A | * | 8/1952 | Baldwin | B65G 65/22 |
| | | | | | 198/674 |
| 10,694,657 | B2 | * | 6/2020 | Grieshop | B05B 5/1683 |
| 2010/0209224 | A1 | * | 8/2010 | Travis | A01C 15/003 |
| | | | | | 414/539 |
| 2010/0303597 | A1 | * | 12/2010 | Mohns | B60P 1/42 |
| | | | | | 414/518 |
| 2012/0275888 | A1 | * | 11/2012 | Claussen | B65G 41/005 |
| | | | | | 414/304 |
| 2016/0330900 | A1 | * | 11/2016 | Thomas | A01C 7/004 |
| 2019/0294150 | A1 | * | 9/2019 | Klubertanz | G05B 19/4141 |

* cited by examiner

Primary Examiner — Glenn F Myers
(74) Attorney, Agent, or Firm — Jeffrey A. Proehl; Woods, Fuller, Shultz & Smith, PC (57) ABSTRACT A seed containing and dispensing system may include a mobile base, a primary hopper on the mobile base with an interior to hold particulate material and having a dispensing opening, and a conveyor to transfer particulate material received by the conveyor from the hopper. The conveyor may rotatable with respect to the primary hopper about a rotation axis to at least two positions. The system also including a dispensing apparatus configured to dispense a substance into the particulate material conveyed by the conveyor, and the dispensing apparatus may be configured to move with the conveyor as the conveyor rotates with respect to the primary hopper to permit dispensing of the substance at each of the at least two positions.

16 Claims, 10 Drawing Sheets

SEED CONTAINING AND DISPENSING SYSTEM

REFER TO RELATED APPLICATIONS

This application claims the priority benefit of U.S. Provisional Patent Application No. 62/993,872, filed Mar. 24, 2020, which is hereby incorporated by reference in its entirety.

BACKGROUND

Field

The present disclosure relates to seed carts and more particularly pertains to a new seed containing and dispensing system having advantageous features for incorporating substances in the feed being dispensed.

SUMMARY

In one aspect, the present disclosure relates to a seed containing and dispensing system which may comprise a mobile base, a primary hopper supported on the mobile base and having an interior configured to hold particulate material and a dispensing opening, and a conveyor configured to transfer particulate material received by the conveyor from the primary hopper. The conveyor may be rotatable with respect to the primary hopper about a rotation axis to at least two positions, and the conveyor may be elongated along an longitudinal axis with an input end and an output end. The conveyor may include a collecting hopper configured to collect particulate material exiting the dispensing opening of the primary hopper. The system may also include a dispensing apparatus configured to dispense a substance into the particulate material conveyed by the conveyor, and the dispensing apparatus may be configured to move with the conveyor as the conveyor rotates with respect to the primary hopper to permit dispensing of the substance at each of the at least two positions.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
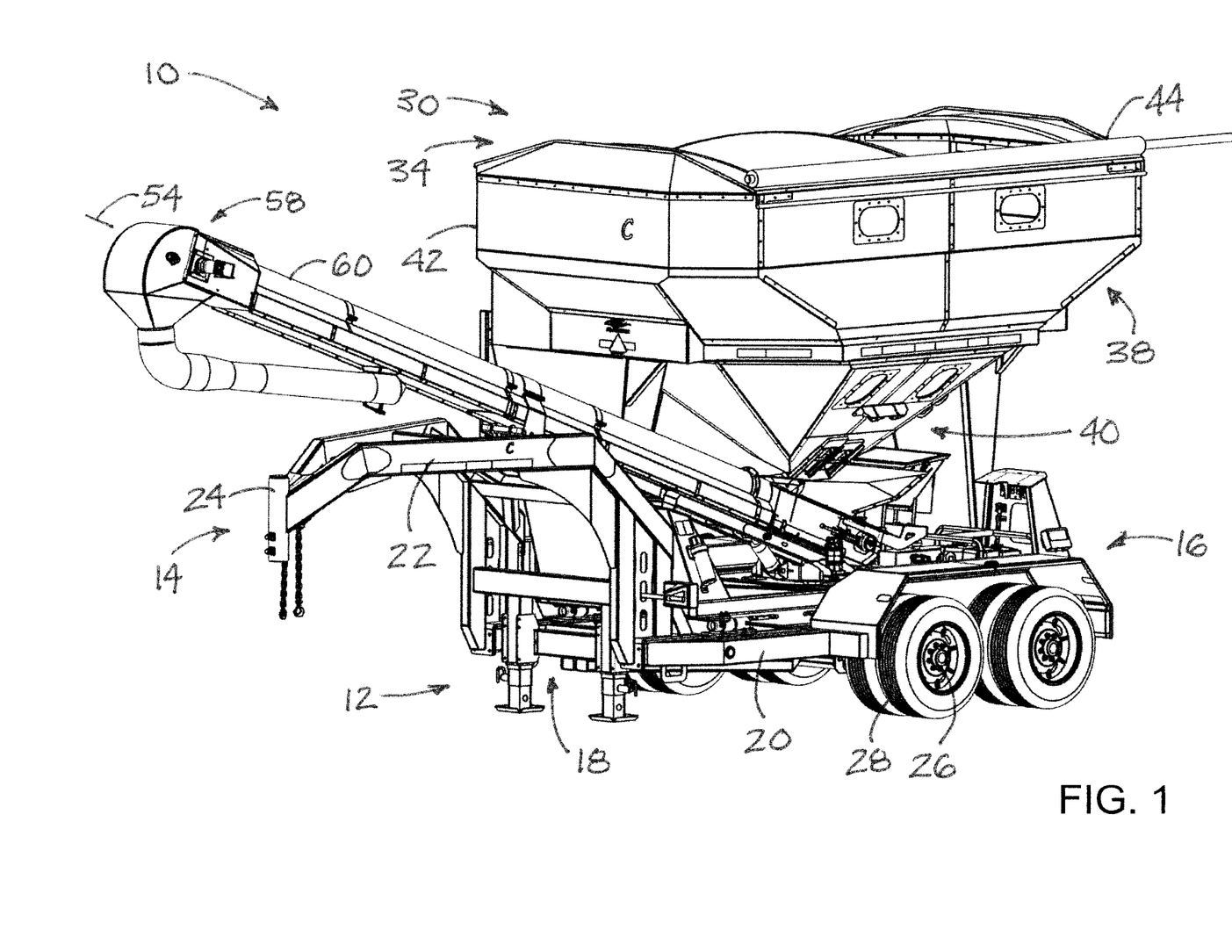
FIG. 1 is a schematic perspective view of a new seed containing and dispensing apparatus according to the present disclosure with the conveyor of the apparatus in a first position.
Figure 2:
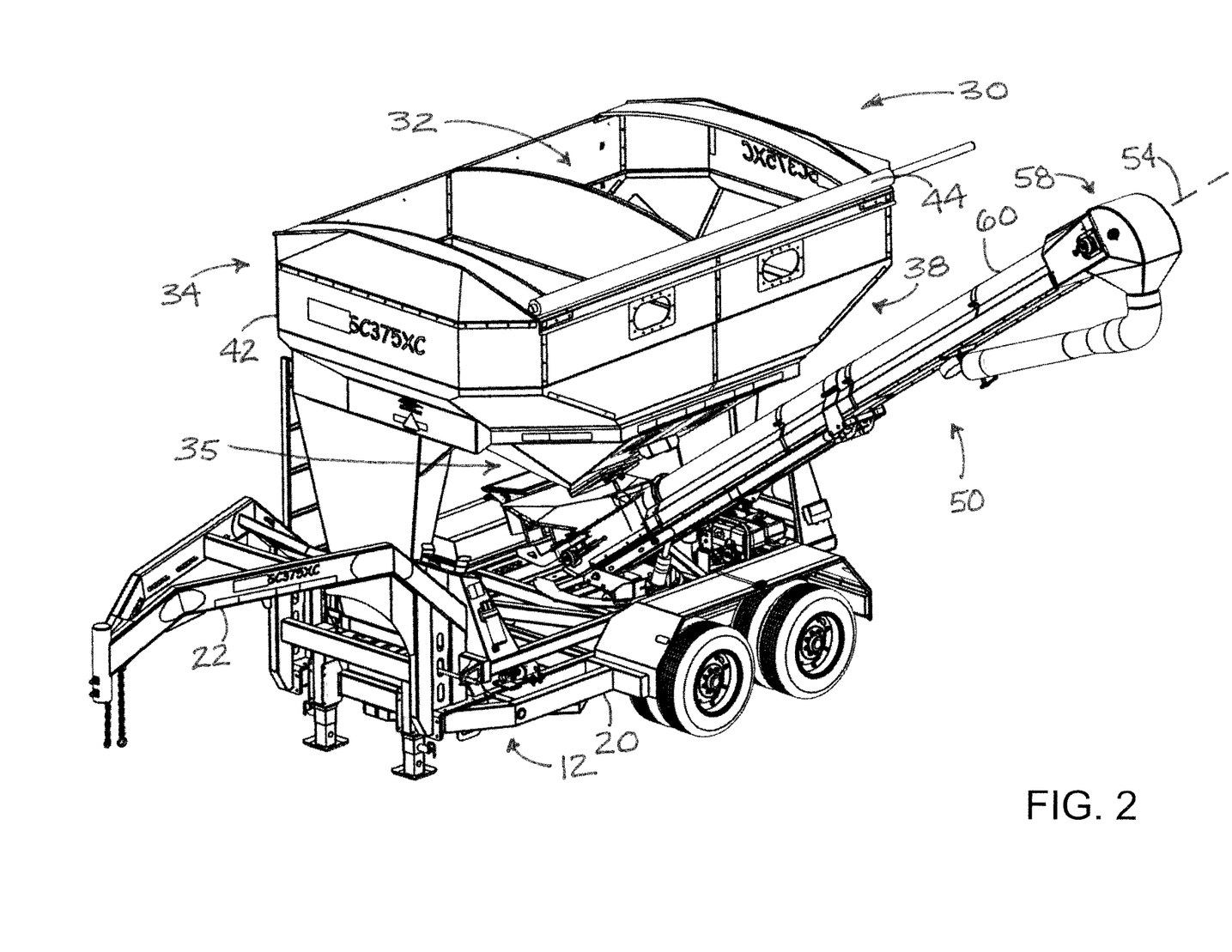
FIG. 2 is a schematic perspective view of the seed containing and dispensing apparatus according to the present disclosure with the conveyor in a second position.
Figure 3:
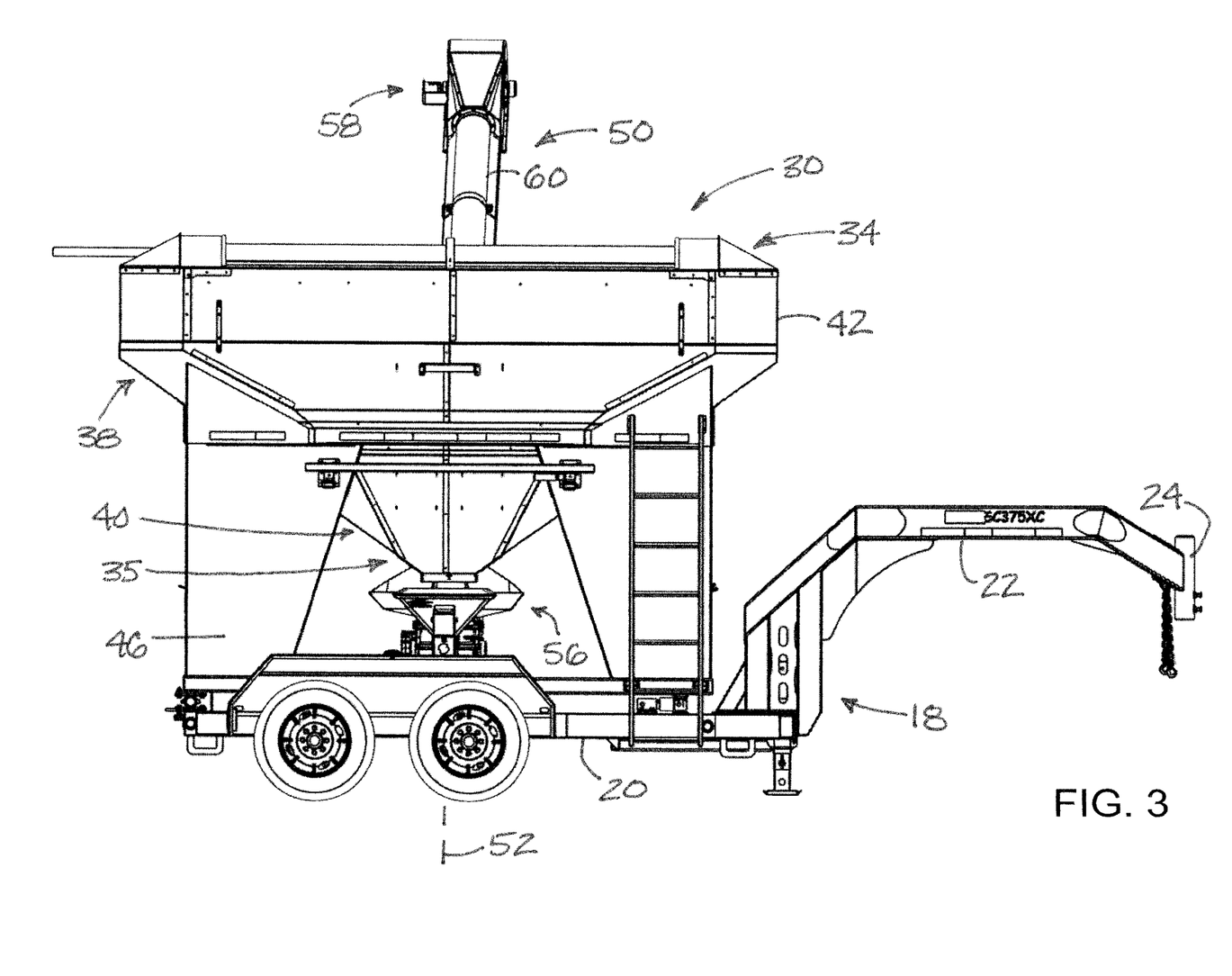
FIG. 3 is a schematic side view of the apparatus according to an illustrative embodiment with the conveyor in the second position.
Figure 4:
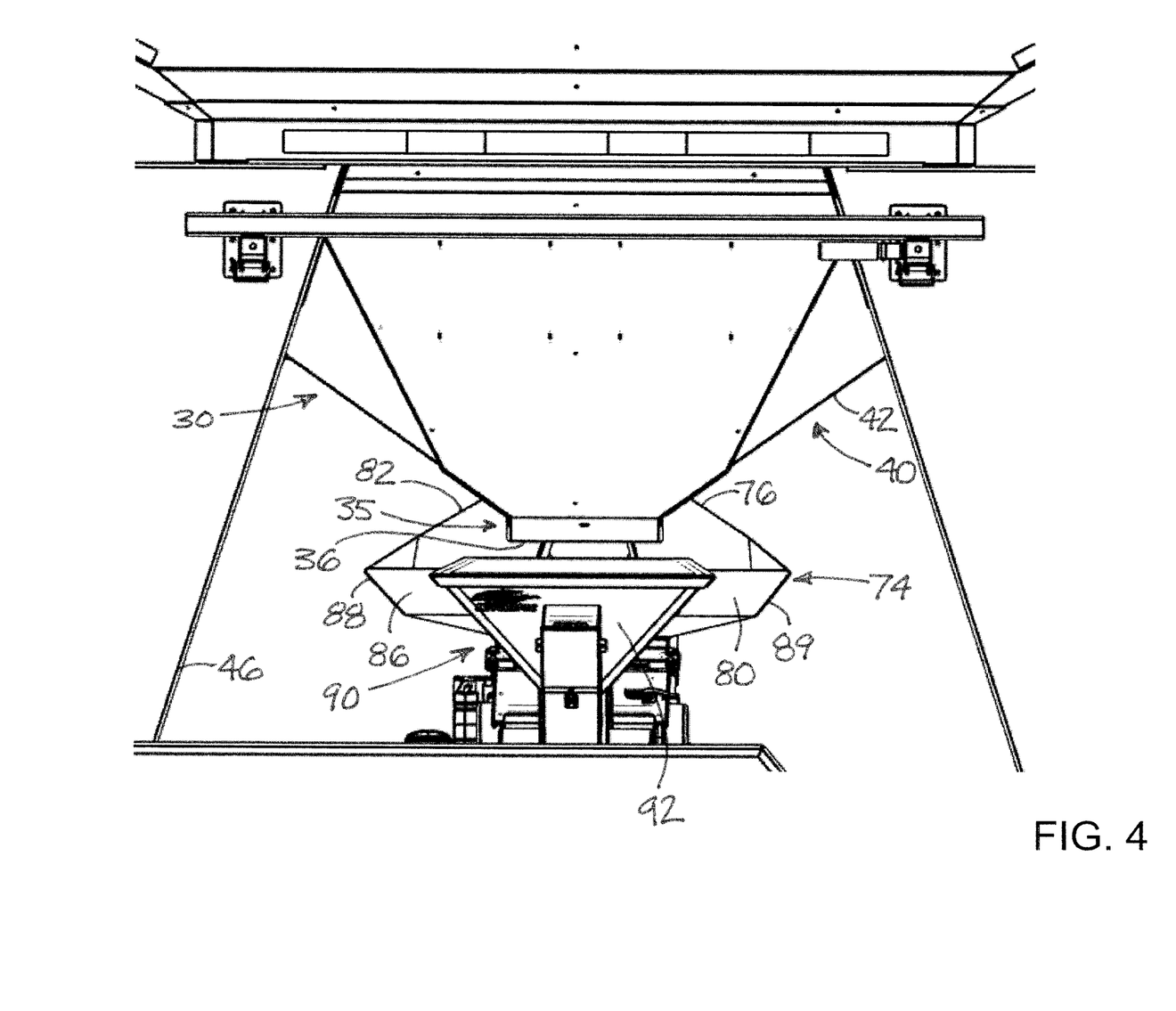
FIG. 4 is a schematic side view of a portion of FIG. 3 enlarged to show detail of the lower portion of the primary hopper and the input end of the conveyor with the dispensing apparatus, according to an illustrative embodiment.
Figure 5:
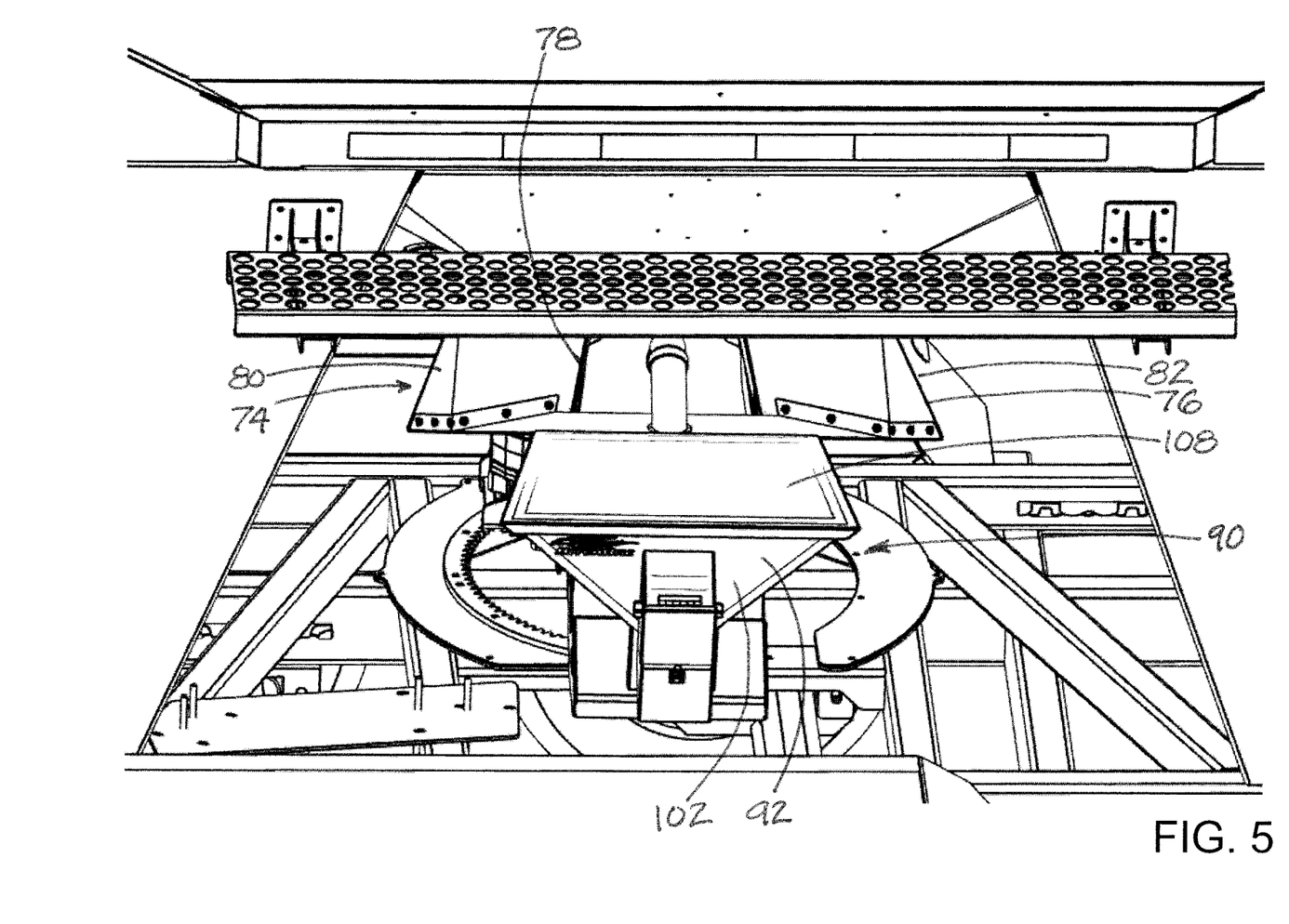
FIG. 5 is a schematic perspective view of the portion depicted in FIG. 4 with the lower portion of the primary hopper and the input end of the conveyor with the dispensing apparatus, according to an illustrative embodiment.
Figure 6:
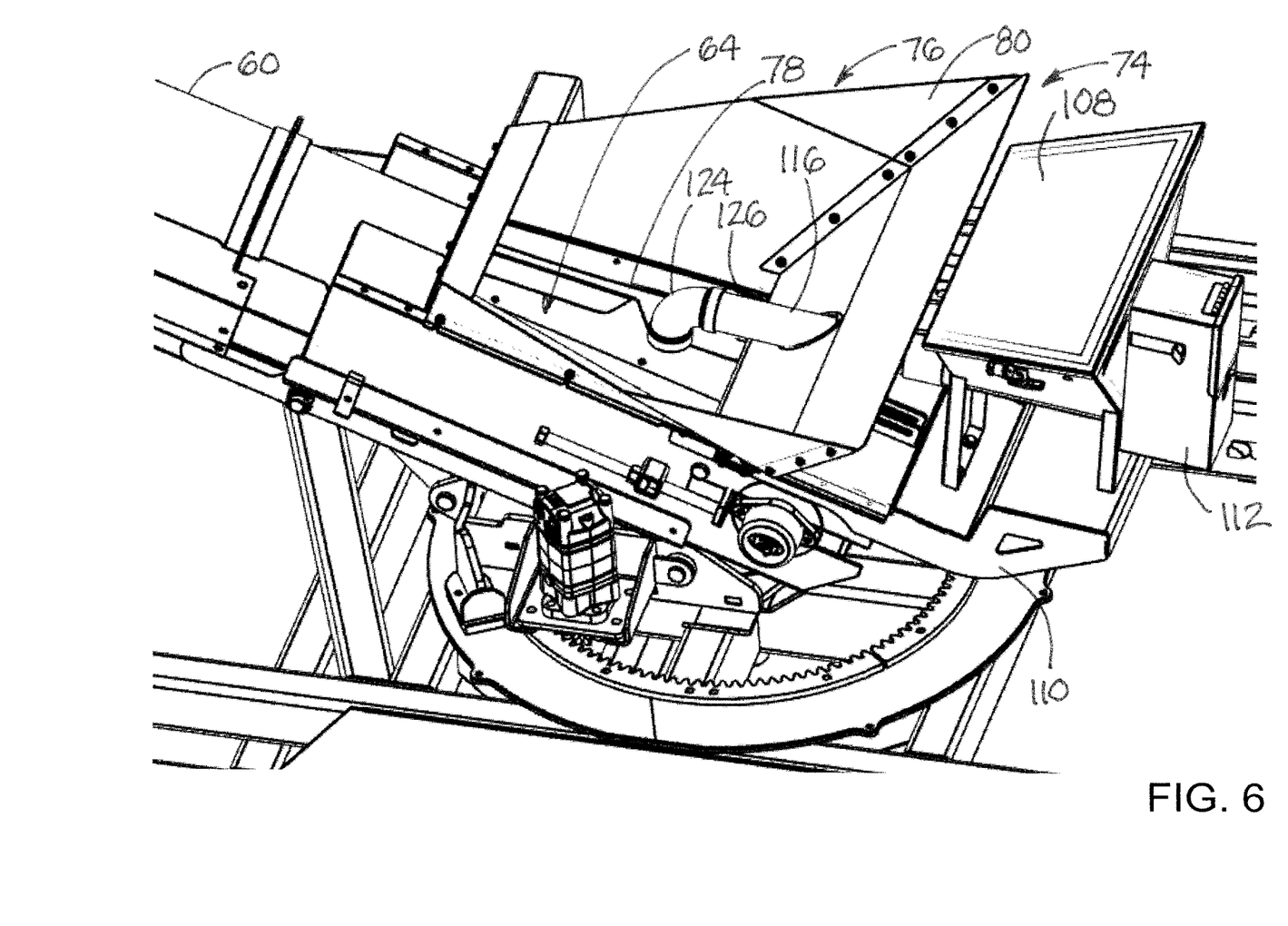
FIG. 6 is a schematic perspective view of selected elements of the conveyor and the dispensing apparatus shown isolated from other elements of the apparatus, according to an illustrative embodiment.
Figure 7:
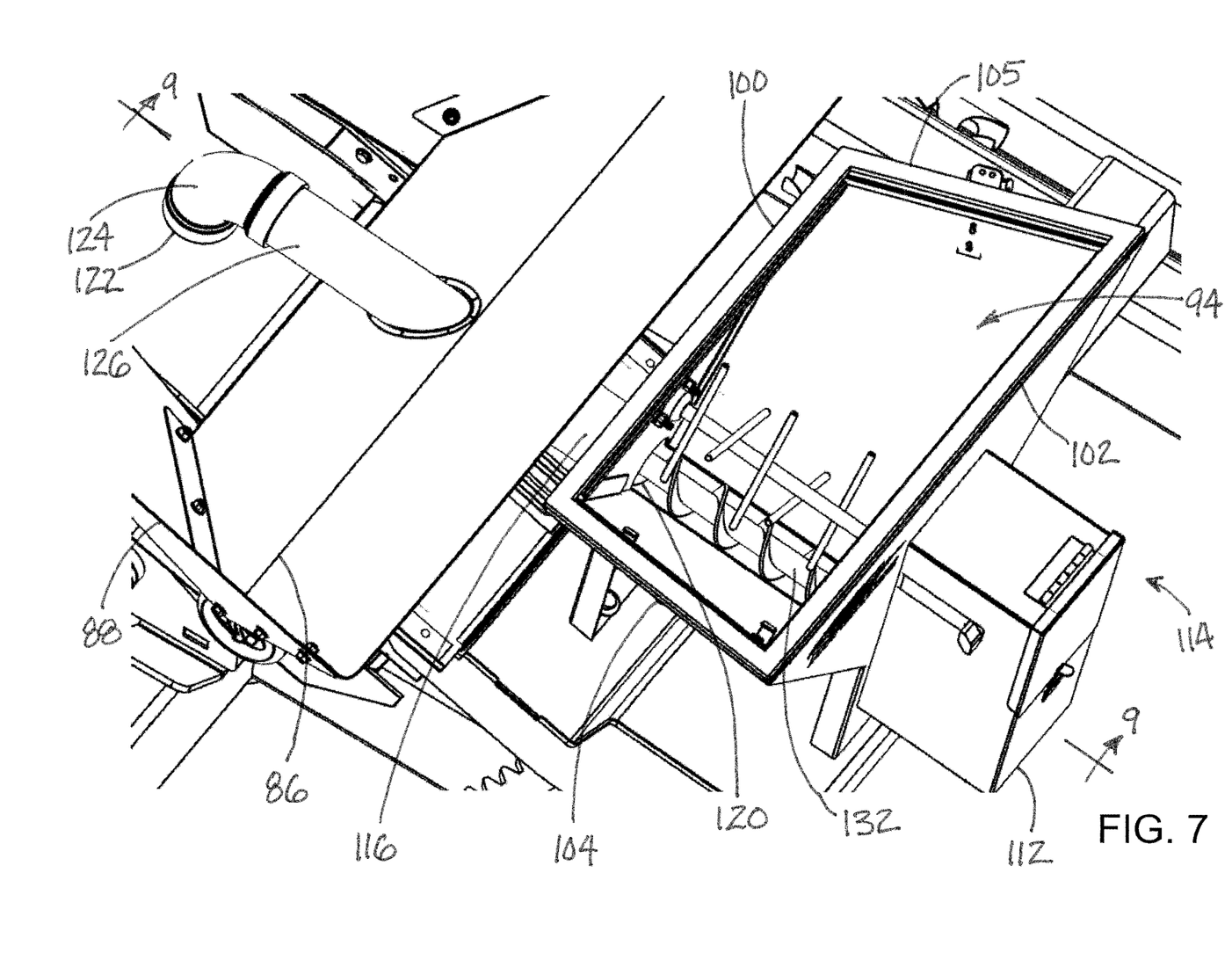
FIG. 7 is a schematic perspective view of selected elements of the conveyor and the dispensing apparatus shown isolated from other elements of the apparatus, with the hopper cover removed from the dispensing apparatus, according to an illustrative embodiment.
Figure 8:
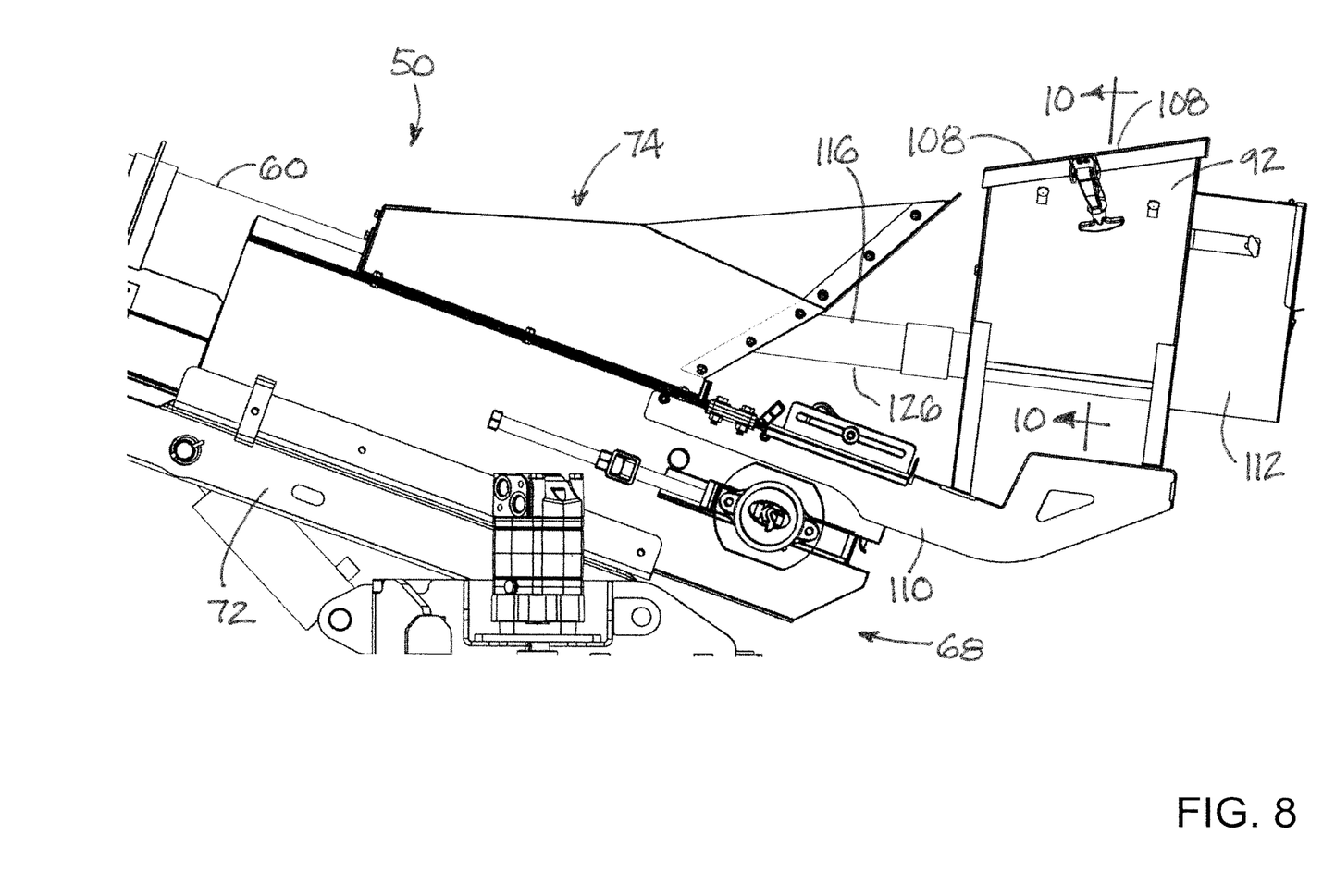
FIG. 8 is a schematic side view of the input end of the conveyor and the dispensing apparatus isolated from other elements of the apparatus, according to an illustrative embodiment.
Figure 9:
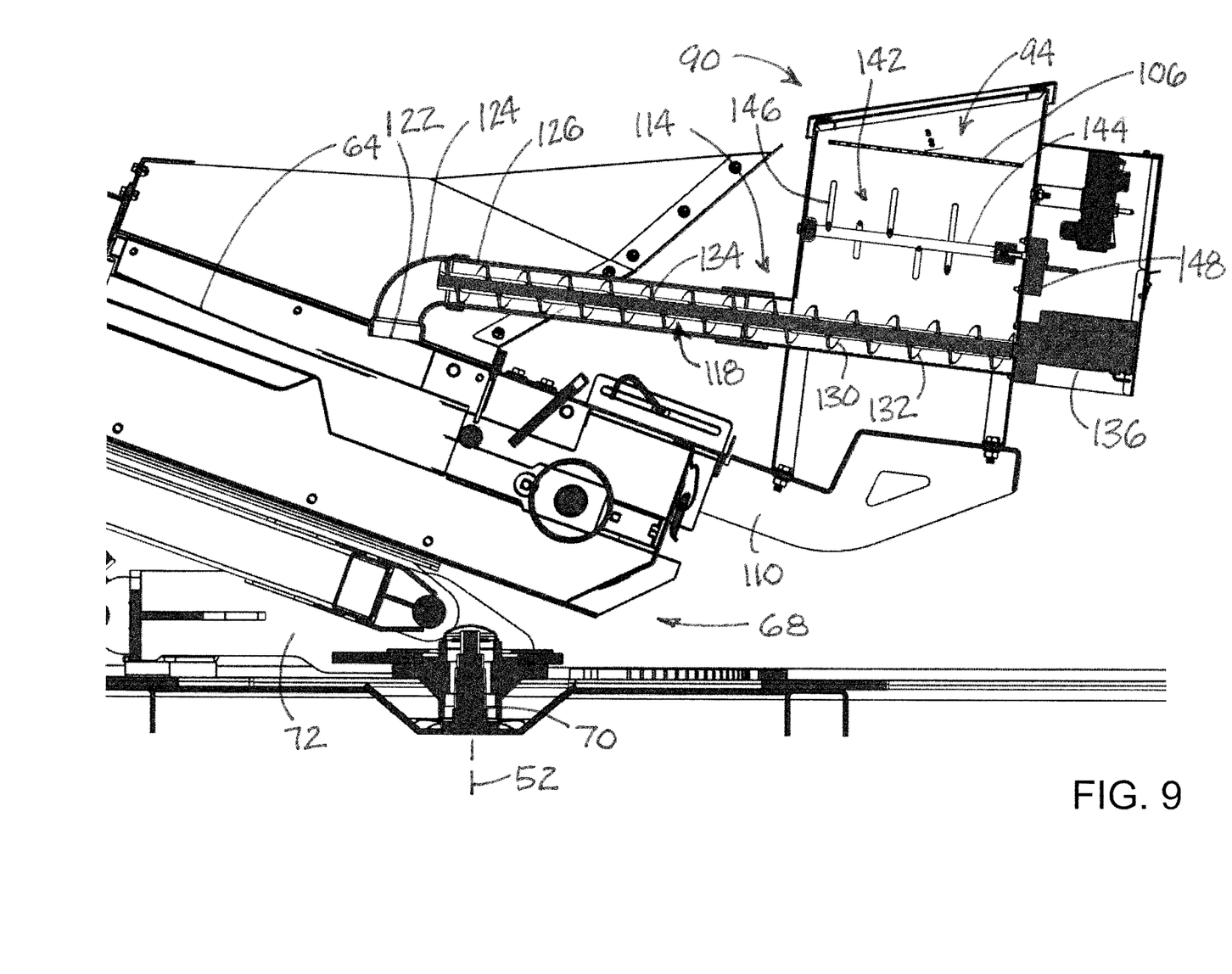
FIG. 9 is a schematic side sectional view of the input end of the conveyor and the dispensing apparatus taken along line 9-9 of FIG. 7, according to an illustrative embodiment.
Figure 10:
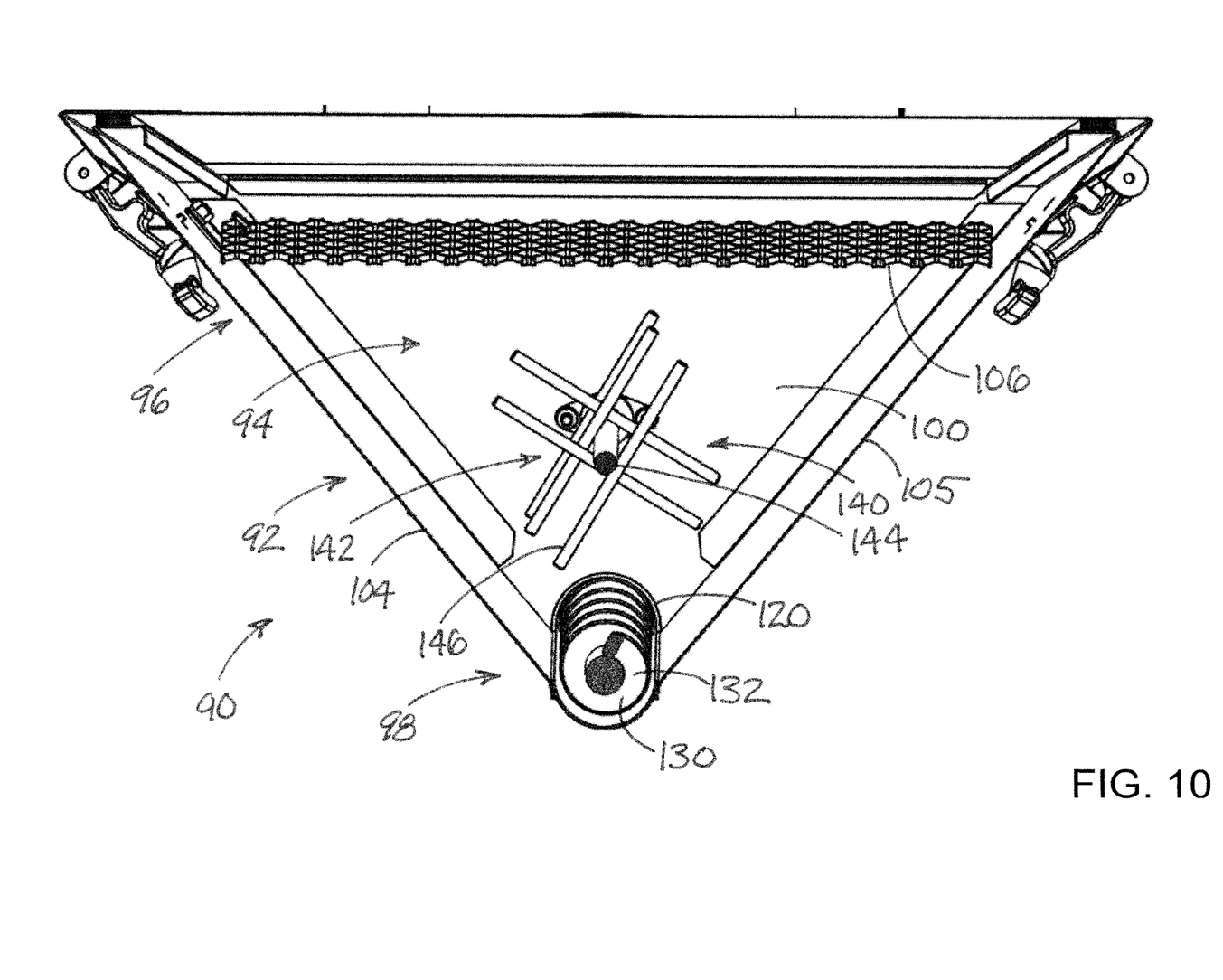
FIG. 10 is a schematic rear sectional view of elements of the dispensing apparatus taken along line 10-10 of FIG. 8, according to an illustrative embodiment.

With reference now to the drawings, and in particular to FIGS. 1 through 10 thereof, a new seed containing and dispensing system embodying the principles and concepts of the disclosed subject matter will be described.

The applicants recognize that various dry lubricant substances have been added to crop seed to facilitate movement of the crop seed through the various seed handling apparatus utilized to transport and convey seed as well as plant the seed in the ground. Suitable dry lubricant substances typically have a powder form when added to the crop seed. Illustrative examples of the dry lubricant substances include talc and graphite, as well as combinations of talc and graphite, although other suitable substances may be utilized. Talc is the common name for a clay mineral including hydrated magnesium silicate, and graphite is the name applied to a particular crystalline form of elemental carbon.

More advantageously, the lubricant substances are added to the crop seed relatively early in the seed conveying process, but usually close enough to the time and place that the seed is to be planted so that the substance does not, for example, have a significant opportunity to separate from the seed flow or absorb excessive levels of moisture. In some of the most ideal utilizations, the dry lubricant substances are added to the crop seed as the seed leaves a bulk container or hopper and the seed is being deposited into the seed planter apparatus.

The applicants also recognize that devices have been utilized to add the lubricant substances to the crop seed as the crop seed enters a conveyor on a bulk seed transporting apparatus, sometimes referred to as a seed cart or seed tender. Such an approach has been suitable as long as the conveyor of the seed transport apparatus is mounted on the apparatus in a manner that maintains at least a portion of the conveyor in a stationary relationship with respect to other elements of the apparatus.

However, moving or rotating conveyors are increasingly utilized on the bulk seed transporting apparatus which enhances the ease of using the seed transporting apparatus, but also has prevented the use of heretofore known devices for adding the dry lubricant to the crop seed flow. This has resulted in the need to forgo the addition of the dry lubricant substance to the crop seed or add the dry lubricant substance to the seed flow at a less than optimal location in the overall path of crop seed movement.

The applicants have developed a seed containing and dispensing system which utilizes a substance dispensing apparatus which advantageously may be used in connection or in combination with conveyors which have the capability of a high degree of movement with respect to other elements of the system, such as the frame or the primary hopper of the bulk seed transporting apparatus. In some embodiments of the disclosure, the substance dispensing apparatus is mounted on or otherwise connected to the conveyor in a manner such that movement of the conveyor generally produces substantially corresponding movement of the dispensing apparatus to maintain the relationship between the conveyor and the dispensing apparatus.

In one aspect, the disclosure relates to a seed containing and dispensing system 10 which has as one of its primary uses the transport of particulate material, such as crop seed, from one location to another location, such as an agricultural field and an agricultural implement such as a seed planter to be utilized to plant the seed in the field. As the sophistication and cost of crop seeds has increased, increasingly specialized apparatus have been developed to handle that seed in an efficient manner that minimizes potential loss of the seed through spillage as well as damage to the seed itself or any coatings applied to the seed.

In the illustrative embodiments, the system 10 may include a mobile base 12 which is movable across a ground surface such as a road or the surface of an agricultural field. Typically the mobile base 12 is towable behind a towing vehicle, such as a truck or pickup, although it is contemplated that aspects of the system may be incorporated into a mobile base that includes a prime mover. The mobile base 12 may have a front 14 and a rear 16 relative to a forward direction of travel for the base when the system 10 is being towed behind a vehicle. Illustratively, the mobile base 12 may include a frame 18 which may have a main portion 20 and a tongue portion 22 which is generally oriented toward the towing vehicle when the mobile base is being towed. A hitch 24 may be located on the tongue portion 22 of the frame, and is suitably configured to be hitched are connected to a towing vehicle. The mobile base 12 may also have an axle 26 which is mounted on the main portion 20 of the frame, and wheels 28 mounted on the axle 26 which support the frame above the ground surface.

The system 10 may also include a primary hopper 30 with an interior 32 which is configured to hold particulate material, such as crop seed, during movement of the system 10 over the road and the field. The primary hopper 30 is supported on the mobile base 12, and may be mounted on the frame 18. Generally, the primary hopper 30 has a top 34 and a bottom 35, and the top may be open for receiving or loading particulate material into the interior 32. The primary hopper 30 may also have a dispensing opening 36 located at the bottom 35 of the hopper 30 through which the contents of the interior 32, such as the particulate material, exits or is otherwise dispensed from the primary hopper. In some embodiments, the primary hopper may have an upper portion 38 and a lower portion 40, and at least the lower portion of the primary hopper may taper smaller in cross sectional area toward the bottom 35 of the hopper 30 two final the material toward the dispensing opening.

In the illustrative embodiments, the primary hopper 30 may include a peripheral wall 42 which may extend generally between the top 34 and bottom 35 of the hopper. A cover 44 may be provided for selectively closing the open top 34 of the hopper 30, and the cover 44 may be mounted on the peripheral wall 42 and may be movable between a closed position covering the open top and an open position in which the open top is exposed for the introduction of the material. The primary hopper 30 may also include a plurality of hopper supports 46 which are positioned between the primary hopper and the mobile base, and illustratively the hopper supports may extend between the upper portion 38 of the hopper 30 and the frame 18.

The system 10 may further include a conveyor 50 which is configured to transfer particulate material exiting the hopper to a location adjacent to the system 10, and typically raises the particulate material to a higher vertical level than the dispensing opening 36 to fill containers on other vehicles, such as smaller seed carts, or agricultural implements such as planters. The conveyor 50 may be rotatable with respect to the primary hopper 30 about a rotation axis 52 to at least two different positions with respect to the hopper 30 (see, e.g., FIGS. 1 and 2). The rotation axis 52 may be substantially vertically oriented and extend through the dispensing opening 36 of the hopper 30. The conveyor 50 may be elongated with a longitudinal axis 54 with opposite ends. The conveyor may have an input end 56 positioned proximate to the dispensing opening 36 for receiving particulate material from the opening 36, and an output end 58 opposite of the input end 56 and capable of being located relatively remote from the opening 36.

Illustratively, the conveyor 50 may include a conveyor tube 60 which defines a tube interior that extends between the input 56 and output 58 ends of the conveyor. The conveyor tube 60 may have an input opening 64 located at or close to the input end 56 of the conveyor. The conveyor 50 may also include a conveyor element which is positioned in the tube interior. In some embodiments, the conveyor element may comprise any suitable type of conveying element, such as, for example, an auger, or a conveyor belt with (or without) cleats. A conveyor support 68 may be provided to support the conveyor tube 60 on the mobile base, and may be rotatably mounted on the frame 18 of the mobile base to facilitate rotation of the conveyor relative to the frame. In some embodiments, the conveyor support 68 may include a pivot shaft 70 which is mounted on the frame and may be substantially aligned with the rotation axis 52, and a support arm 72 which may be rotatably mounted on the pivot shaft 70 such that the arm 72 rotates about the axis 52.

The conveyor 50 may also include a collecting hopper 74 which is configured to collect particulate material exiting the dispensing opening 36 of the primary hopper. The collecting hopper 74 may be configured to catch particulate material that falls from the dispensing opening under the influence of gravity. The collecting hopper 74 may be in communication with the tube interior of the conveyor tube 60 to permit movement of material in the hopper to the tube interior. The collecting hopper 74 may have an upper opening 76 and a lower opening 78, with the upper opening being positioned below the dispensing opening 36 and the lower opening being in communication with the input opening 64 of the conveyor tube 60. In some embodiments, the collecting hopper 74 may have a cross-sectional area in a plane oriented substantially perpendicular to an axis extending between the upper 76 and lower 78 openings, and the cross-sectional area may taper smaller from the upper opening toward the lower opening. The collecting hopper 74 may comprise a perimeter wall 80 which defines the upper opening 76 as well as the lower opening 78. The upper opening may be defined by a perimeter edge 82, and the perimeter wall may be formed by a forward wall portion 84, a rearward wall portion 86 and a pair of side wall portions 88, 89 which extend between the forward 84 and rearward 86 wall portions. The wall portions may extend generally between the upper and lower openings and may define the perimeter edge 82.

A dispensing apparatus 90 may be included in the system 10 that is configured to dispense the substance into the particulate material conveyed by the conveyor 50. As mentioned, the substance dispensed by the dispensing apparatus may have a lubricating effect on the movement of the particulate material through, for example, the conveyor. The dispensing apparatus 90 may be configured to move with the conveyor 50 as the conveyor moves with respect to at least one element of the mobile base 12, the frame 14, and/or the primary hopper 30. The dispensing apparatus 90 may rotate with the conveyor 50, such as about the rotation axis 52. In some embodiments, the dispensing apparatus 90 may be positioned adjacent to the input end 56 of the conveyor, and may be positioned adjacent to the collecting hopper 74 of the conveyor. Illustratively, the dispensing apparatus may be positioned relative to the collecting hopper at a location that is substantially opposite of the conveyor tube 60.

The dispensing apparatus 90 may include a dispensing hopper 92 which defines a chamber 94 for holding a quantity of the substance to be dispensed. The dispensing hopper 92 may have an upper extent 96 and a lower extent 98, and may be positioned adjacent to the collecting hopper 74 of the conveyor in an arrangement, for example, in which the collecting hopper is positioned between the dispensing hopper and the conveyor tube 60. In some embodiments, the dispensing hopper 92 may include a front wall 100 and a rear wall 102 with the chamber 94 being positioned therebetween and the front wall being positioned relatively closer to the collecting hopper. The dispensing hopper 92 may also include a pair of side walls 104, 105 which extend between the front 100 and rear 102 walls. The side walls 104, 105 may converge toward each other at the lower extent 98 of the hopper 92 and may diverge away from each other toward the upper extent 96 of the hopper.

The dispensing apparatus 90 may also include a grate 106 which assists in the breakup of any agglomerations of the substance prior to entering the chamber 94 as well as resisting the passage of relatively large foreign objects into the chamber. The grate 106 may extend across the chamber 94 of the dispensing hopper at a location that is spaced upwardly from the lower extent 98. The grate may have a plurality of holes through which the substance passes to reach the portion of the chamber at the lower extent. The dispensing apparatus 90 may also include a hopper cover 108 which is removably mounted on the upper extent 96 of the dispensing hopper and may engage upper regions of the walls of the hopper 92 to close the hopper chamber from moisture, contaminants, and other undesirable things, while permitting the substance to be refilled into the chamber. A hopper support 110 may be mounted on the dispensing hopper 92 and a portion of the conveyor 50 in a manner that supports the dispensing hopper on the conveyor and effectively moves the dispensing apparatus with the conveyor as the conveyor rotates with respect to the frame 18 of the mobile base. Further, a housing 112 may be provided for housing various elements of the dispensing apparatus 90, and may be mounted on the dispensing hopper 92 or the hopper support 110.

The dispensing apparatus 90 may also include a dispensing conveyor device 114 which is configured to transfer the substance in the dispensing hopper to the collecting hopper 74 of the conveyor such that the substance is able to enter the hopper 74 and be mixed with the particulate material in the collecting hopper as it is moved into the conveyor tube 60. The dispensing conveyor device 114 may include a dispensing tube 116 which defines an interior 118 through which the substance is conveyed. The dispensing tube 160 may have an entry 120 in communication with the chamber 94 of the dispensing hopper, and may have an exit 122 in communication with the interior of the collecting hopper. Illustratively, the entry 120 of the dispensing tube may extend through the front wall 100 of the dispensing hopper, and may pass through the perimeter wall 80 of the collecting hopper such that a section of the dispensing tube 116 may extend into the interior of the collecting hopper. The dispensing tube 116 may have an exit portion 124 located adjacent to the exit 122 of the tube 116, and the exit portion may be oriented substantially perpendicular to the longitudinal axis 54 of the conveyor. The dispensing tube 116 may also have a main portion 126 which may be oriented substantially parallel to the longitudinal axis 54.

The dispensing conveyor device 114 may also include a dispensing conveyor element 130 which is configured to move the substance through the dispensing tube 116 from the chamber 94 of the dispensing hopper 92 to the collecting hopper. The dispensing conveyor element 130 may include a first portion 132 to engage and move the substance in the chamber 94 of the dispensing hopper. The conveying element 130 may be positioned in the chamber 94 of the dispensing hopper, and may be located toward the bottom of the chamber and the lower extent of hopper 92 to engage portions of the substance at the bottom. The dispensing conveyor element 130 may also include a second portion 134 which is positioned in the interior 118 of the dispensing tube 116, and may be located primarily in the main portion of the dispensing tube for moving the substance toward the exit 122 of tube 116. Illustratively, and highly suitably, the dispensing conveyor element 130 comprises an auger, although it is possible that other conveyance elements may be utilized.

The dispensing conveyor device 140 may also include an auger motor 136 connected to the dispensing conveyor element 130 to move the element 130, such as rotate the auger of element 130. The auger motor 136 may be located in the housing 112, and may operate the auger of the dispensing conveyor element through the rear wall 102 of the dispensing hopper 92.

The dispensing apparatus 90 may also include an agitator assembly 140 which is configured to agitate the substance in the chamber 94 of the dispensing hopper to facilitate engagement of the substance by the dispensing conveyor device and discourage bridging of the material in the chamber. The agitator assembly 140 may include an agitator 142 which is positioned in the chamber 94 and may be rotatable with respect to the dispensing hopper 92. The agitator 142 may be located above the dispensing conveyor element 130 in the chamber 94, and may be located below the grate 106 when utilized. In some embodiments, the agitator 142 may have an axis of rotation extending substantially parallel to the axis of rotation of the dispensing conveyor element. Illustratively, the agitator may include a central shaft 144 which extends into the chamber 94 of the dispensing hopper, and a plurality of mixing elements 146 which are mounted on the central shaft 144 may extend from the central shaft to contact and move the substance positioned in the chamber 94 and facilitate movement of the substance to reach the conveyor element 130. Further, an agitator motor 148 may be connected to the agitator 142 to rotate the agitator with respect to the dispensing hopper. The agitator motor 148 may be located in the housing 112.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A seed containing and dispensing system comprising:
    a mobile base;
    a primary hopper supported on the mobile base and having an interior configured to hold particulate material, the primary hopper having a dispensing opening;
    a conveyor configured to transfer particulate material received by the conveyor from the primary hopper, the conveyor being rotatable with respect to the primary hopper about a rotation axis to at least two positions, the conveyor being elongated along an longitudinal axis with an input end and an output end, the conveyor including a collecting hopper configured to collect particulate material exiting the dispensing opening of the primary hopper; and
    a dispensing apparatus configured to dispense a substance having a powdered form into the particulate material conveyed by the conveyor, the dispensing apparatus being configured to move with the conveyor as the conveyor rotates with respect to the primary hopper to permit dispensing of the substance having the powdered form into the particulate material in the collecting hopper at each of the at least two positions of the conveyor.

2. The system of claim 1 wherein the dispensing apparatus is carried by the conveyor.

3. The system of claim 1 wherein the dispensing apparatus comprises a dispensing hopper defining a chamber for holding a quantity of the substance having a powdered form, the dispensing hopper being positioned adjacent to the collecting hopper of the conveyor.

4. The system of claim 1 wherein the dispensing apparatus comprises a dispensing hopper defining a chamber for holding a quantity of the substance; and wherein the dispensing apparatus comprises a hopper support mounted on the dispensing hopper and the conveyor in a manner supporting the dispensing hopper on the conveyor.

5. The system of claim 1 wherein the dispensing apparatus comprises:

a dispensing hopper defining a chamber for holding a quantity of the substance having a powdered form; and a dispensing conveyor device configured to transfer the substance having a powdered form from the dispensing hopper to the collecting hopper.

6. The system of claim 5 wherein the dispensing conveyor device comprises a dispensing tube defining an interior in communication with the collecting hopper and the chamber of the dispensing hopper; and a dispensing conveyor element for moving the substance having a powdered form from the chamber of the dispensing hopper to the collecting hopper.

7. The system of claim 6 wherein the dispensing conveyor element comprises an auger.

8. The system of claim 6 wherein the dispensing conveyor device comprises an auger motor connected to the dispensing conveyor element to rotate the dispensing conveyor element with respect to the dispensing tube to move the substance having a powdered form from an entry of the dispensing tube to an exit of the dispensing tube.

9. The system of claim 1 wherein the dispensing apparatus comprises:

a dispensing hopper defining a chamber for holding a quantity of the substance having a powdered form, and an agitator assembly configured to agitate the substance having powdered form in the chamber of the dispensing hopper.

10. The system of claim 1 wherein the conveyor includes:

a dispensing hopper defining a chamber for holding a quantity of the substance having a powdered form; and a conveyor tube and a conveyor element positioned in the conveyor tube, the conveyor tube being in communication with the chamber of the dispensing hopper to carry the substance having a powdered form from the chamber.

11. The system of claim 10 wherein the dispensing hopper is positioned relative to the conveyor such that the collection hopper is positioned between the dispensing hopper and the conveyor tube of the conveyor.

12. The system of claim 1 wherein the dispensing apparatus comprises a dispensing hopper defining a chamber for holding a quantity of the substance having a powdered form; and additionally comprising a quantity of the substance having a powered form positioned in the dispensing hopper, the substance having a powdered form comprising a dry lubricant.

13. The system of claim 1 wherein the conveyor includes a tube defining a tube interior;

wherein the collecting hopper is configured to hold a quantity of the particulate material after the quantity of particulate material has exited the primary hopper and prior to the particulate material entering the tube interior of the tube of the conveyor; and wherein the dispensing apparatus is configured to dispense the substance having a powdered form into the collecting hopper to mix with the particulate material prior to entering the tube interior of the tube of the conveyor.

14. The system of claim 1 wherein the dispensing apparatus includes a dispensing conveyor configured to carry a quantity of the substance having the powdered form along a portion of the conveyor to reach the collecting hopper.

15. A seed containing and dispensing system comprising:

a mobile base;

a primary hopper supported on the mobile base and having an interior configured to hold particulate material, the primary hopper having a dispensing opening;

a conveyor configured to transfer particulate material received by the conveyor from the primary hopper, the conveyor being rotatable with respect to the primary hopper about a rotation axis to at least two positions, the conveyor being elongated along an longitudinal axis with an input end and an output end, the conveyor including a collecting hopper configured to collect particulate material exiting the dispensing opening of the primary hopper;

a dispensing apparatus configured to dispense a substance into the particulate material conveyed by the conveyor, the dispensing apparatus being configured to move with the conveyor as the conveyor rotates with respect to the primary hopper to permit dispensing of the substance at each of the at least two positions;

wherein the dispensing apparatus comprises:

a dispensing hopper defining a chamber for holding a quantity of the substance, the dispensing hopper being separate of the collecting hopper of the conveyor; and an agitator assembly configured to agitate the substance in the chamber of the dispensing hopper.

16. A seed containing and dispensing system comprising:

a mobile base;

a primary hopper supported on the mobile base and having an interior configured to hold particulate material, the primary hopper having a dispensing opening;

a conveyor configured to transfer particulate material received by the conveyor from the primary hopper, the conveyor being rotatable with respect to the primary hopper about a rotation axis to at least two positions, the conveyor being elongated along an longitudinal axis with an input end and an output end, the conveyor including a collecting hopper configured to collect particulate material exiting the dispensing opening of the primary hopper;

a dispensing apparatus configured to dispense a substance into the particulate material conveyed by the conveyor, the dispensing apparatus being configured to move with the conveyor as the conveyor rotates with respect to the primary hopper to permit dispensing of the substance at each of the at least two positions;

wherein the dispensing apparatus comprises:

a dispensing hopper defining a chamber for holding a quantity of the substance; and a dispensing conveyor device configured to transfer the substance from the dispensing hopper of the dispensing apparatus to the collecting hopper of the conveyor.

* * * * *